US012686907B2

(12) United States Patent　　(10) Patent No.: US 12,686,907 B2
Tanaka et al.　　(45) **Date of Patent: \*Jul. 21, 2026**

(54) AUSTENITE STAINLESS STEEL MATERIAL, METHOD FOR PRODUCING SAME, AND PLATE SPRING

(71) Applicant: NIPPON STEEL STAINLESS STEEL CORPORATION, Tokyo (JP)

(72) Inventors: Masaya Tanaka, Tokyo (JP); Naoki Hirakawa, Tokyo (JP)

(73) Assignee: NIPPON STEEL CORPORATION, Tokyo (JP)

( \* ) Notice: Subject to any disclaimer, the term of this patent is extended or adjusted under 35 U.S.C. 154(b) by 135 days.

This patent is subject to a terminal disclaimer.

(21) Appl. No.: 18/250,278

(22) PCT Filed: May 19, 2021

(86) PCT No.: PCT/JP2021/019052
§ 371 (c)(1),
(2) Date: Apr. 24, 2023

(87) PCT Pub. No.: WO2022/180869
PCT Pub. Date: Sep. 1, 2022

(65) Prior Publication Data
US 2023/0399728 A1　Dec. 14, 2023

(30) Foreign Application Priority Data

Feb. 24, 2021　(JP) ................................. 2021-027919

(51) Int. Cl.
| | |
|---|---|
| *C21D 9/46* | (2006.01) |
| *C21D 6/00* | (2006.01) |
| *C21D 8/0221* | (2026.01) |
| *C21D 8/0247* | (2026.01) |
| *C22C 38/00* | (2006.01) |
| *C22C 38/02* | (2006.01) |
| *C22C 38/04* | (2006.01) |
| *C22C 38/06* | (2006.01) |
| *C22C 38/34* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |
| *C22C 38/60* | (2006.01) |
| *F16F 1/18* | (2006.01) |

(52) U.S. Cl.
CPC .............. *C22C 38/58* (2013.01); *C21D 6/004* (2013.01); *C21D 8/0226* (2013.01); *C21D 8/0236* (2013.01); *C21D 8/0247* (2013.01); *C21D 9/46* (2013.01); *C22C 38/00* (2013.01); *C22C 38/001* (2013.01); *C22C 38/02* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *F16F 1/18* (2013.01); *C21D 2211/001* (2013.01); *C21D 2211/008* (2013.01)

(58) Field of Classification Search
CPC ...................................................... C22C 38/44
See application file for complete search history.

(56) References Cited

U.S. PATENT DOCUMENTS

| | | | |
|---|---|---|---|
| 2015/0376729 A1* | 12/2015 | Matsubayashi ......... | C22C 38/54 148/624 |
| 2018/0037970 A1 | 2/2018 | Matsumura et al. | |
| 2023/0250522 A1* | 8/2023 | Hirakawa ............... | C22C 38/58 420/45 |
| 2025/0003041 A1* | 1/2025 | Hirakawa ............... | C22C 38/60 |

FOREIGN PATENT DOCUMENTS

| | | | |
|---|---|---|---|
| CN | 103924163 A | | 7/2014 |
| JP | 06207250 A | | 7/1994 |
| JP | 07090372 A | | 4/1995 |
| JP | 10068050 A | | 3/1998 |
| JP | 10140294 A | | 5/1998 |
| JP | 2002146483 A | * | 5/2002 |
| JP | 2017218670 A | | 12/2017 |
| WO | 2019249127 A1 | | 12/2019 |
| WO | 2020251002 A1 | | 12/2020 |

OTHER PUBLICATIONS

English machine translation of JP 2002-146483 A of Takano (Year: 2002).*

\* cited by examiner

*Primary Examiner* — Jophy S. Koshy
(74) *Attorney, Agent, or Firm* — Greer, Burns & Crain, Ltd.

(57) ABSTRACT

An austenitic stainless steel material comprises, on a mass basis, 0.200% or less of C, 4.00% or less of Si, 5.00% or less of Mn, 4.00 to 10.00% of Ni, 12.00 to 18.00% of Cr, 3.50% or less of Cu, 1.00 to 5.00% of Mo, and 0.200% or less of N, a total amount of C and N of 0.100% or more, and the balance being Fe and impurities; wherein the austenitic stainless steel material has a value of $Md_{30}$ of $-40.0$ to $0°$ C., wherein the value of $Md_{30}$ is represented by the following equation (1):

$$Md_{30}=551-462(C+N)-9.2Si-8.1Mn-29(Ni+Cu)-13.7Cr-18.5Mo \quad (1)$$

in which the symbols of the elements each represents a content (% by mass) of each element.

8 Claims, No Drawings

AUSTENITE STAINLESS STEEL MATERIAL, METHOD FOR PRODUCING SAME, AND PLATE SPRING

FIELD OF THE INVENTION

The present invention relates to an austenite stainless steel material, a method for producing the same, and a plate spring.

BACKGROUND OF THE INVENTION

As communication devices such as smartphones and precision devices such as personal computers become smaller and more powerful, the structural and functional parts used in these devices are becoming thinner and lighter. Therefore, the materials used for these parts are required to have excellent workability (ductility) and high strength. In particular, parts such as plate springs, which are exposed to repeated stress, are required to have properties that can withstand repeated stress (settling resistance). Here, the "settling resistance" refers to a property to withstand "settling" which means that the material does not completely return to its original shape due to minute deformation after repeated use under elastic stress.

As a material having both high strength and high ductility, Patent Literature 1 proposes a stainless steel material (meta-stable austenitic stainless steel strip or steel sheet) comprising, in % by mass, 0.05 to 0.15% of C, 0.05 to 1% of Si, 2% or less of Mn, 16 to 18% of Cr, 4 to 11% of Ni, 2.5 to 3.5% of Mo, and one or more selected from 0.1 to 3.5% of Al and 0.1 to 3.5% of Ti, the balance being Fe and unavoidable impurities, wherein the stainless steel material has a two-phase structure of $\alpha'$ phase and $\gamma$ phase, YS (0.2% yield strength) of 1400 to 1900 N/mm$^{-2}$, and YS (0.2% yield strength)×EL (elongation) of 21000 to 48000.

Further, Patent Literature 2 proposes a stainless steel material (a high-strength stainless steel with improved toughness) comprising, in % by mass, 0.10% or less of C, 1.0 to 3.0% of Si, 2.0% or less of Mn, 4.0 to 9.0% of Ni, 12.0 to 18.0% of Cr, 1.0 to 5.0% of Mo, and 0.15% or less of N, the stainless steel material containing C and N so as to satisfy a relationship of C+N≥0.10%, the balance being Fe and unavoidable impurities.

PRIOR ART

Patent Literatures

[Patent Literature 1] Japanese Patent Application Publication No. 2017-218670 A
[Patent Literature 2] Japanese Patent Application Publication No. H06-207250 A

SUMMARY OF THE INVENTION

Problem to be Solved by the Invention

Although the austenitic stainless steel materials described in Patent Literatures 1 and 2 have both high strength and high ductility, they do not consider the settling resistance required for components used in communication devices and precision devices such as plate springs.

The present invention has been made to solve the above problems. An object of the present invention is to provide an austenitic stainless steel material having high strength, high ductility, and improved settling resistance, and to provide a method for producing the same.

Another object of the present invention is to provide a plate spring having high strength, excellent dimensional accuracy, and a long life.

Means for Solving the Problem

The present inventors have found that the above problems can be solved by controlling the composition and metallographic structure of the austenitic stainless steel material, and have completed the present invention.

Thus, the present invention relates to an austenitic stainless steel material, wherein the austenitic stainless steel material comprises, on a mass basis, 0.200% or less of C, 4.00% or less of Si, 5.00% or less of Mn, 4.00 to 10.00% of Ni, 12.00 to 18.00% of Cr, 3.50% or less of Cu, 1.00 to 5.00% of Mo, and 0.200% or less of N, a total amount of C and N of 0.100% or more, and the balance being Fe and impurities;

wherein the austenitic stainless steel material has a value of Md$_{30}$ of −40.0 to 0° C., wherein the value of Md$_{30}$ is represented by the following equation (1):

$$Md_{30}=551-462(C+N)-9.2Si-8.1Mn-29(Ni+Cu)-13.7Cr-18.5Mo \qquad (1)$$

in which the symbols of the elements each represents a content (% by mass) of each element; and wherein the austenitic stainless steel material has a metallographic structure having a dislocation density of a strain-induced martensite phase of $8.0\times10^{16}$ m$^{-2}$ or less, a dislocation density of a retained austenite phase of $1.5\times10^{16}$ to $6.0\times10^{16}$ m$^{-2}$, and a content of the strain-induced martensite phase of 20 to 55% by volume.

Also, the present invention relates to a method for producing an austenitic stainless steel material, the method comprising:

subjecting a rolled material to a solution treatment, followed by cold rolling at a rolling reduction ratio to obtain a dislocation density of a strain-induced martensite phase of $8.0\times10^{16}$ m$^{-2}$ or less, a dislocation density of a retained austenite phase of $1.5\times10^{16}$ to $6.0\times10^{16}$ m$^{-2}$, and a content of the strain-induced martensite phase of 20 to 55% by volume, wherein the rolled material comprises, on a mass basis, 0.200% or less of C, 4.00% or less of Si, 5.00% or less of Mn, 4.00 to 10.00% of Ni, 12.00 to 18.00% of Cr, 3.50% or less of Cu, 1.00 to 5.00% of Mo, and 0.200% or less of N, a total amount of C and N being 0.100% or more, and the balance being Fe and impurities, and wherein the rolled material has a value of Md$_{30}$ of −40.0 to 0° C., the value of Md$_{30}$ being represented by the following equation (1):

$$Md_{30}=551-462(C+N)-9.2Si-8.1Mn-29(Ni+Cu)-13.7Cr-18.5Mo \qquad (1)$$

in which the symbols of the elements each represents a content (% by mass) of each element.

Further, the present invention relates to a plate spring comprising the austenitic stainless steel material as described above.

Effects of Invention

According to the present invention, it is possible to provide an austenitic stainless steel material having high strength, high ductility, and improved settling resistance, and to provide a method for producing the same.

Also, according to the present invention, it is possible to provide a plate spring having high strength, excellent dimensional accuracy, and a long life.

DETAILED DESCRIPTION OF THE INVENTION

Hereinafter, embodiments of the present invention will be specifically described. It is to understand that the present invention is not limited to the following embodiments, and those which have appropriately added changes, improvements and the like to the following embodiments based on knowledge of a person skilled in the art without departing from the spirit of the present invention fall within the scope of the present invention.

It should be noted that, as used herein, the expression "%" in relation to any component means "% by mass", unless otherwise specified.

An austenitic stainless steel material according an embodiment of the present invention contains, on a mass basis, 0.200% or less of C, 4.00% or less of Si, 5.00% or less of Mn, 4.00 to 10.00% of Ni, 12.00 to 18.00% of Cr, 3.50% or less of Cu, 1.00 to 5.00% of Mo, and 0.200% or less of N, a total amount of C and N being 0.100% or more, and the balance being Fe and impurities.

Here, the term "stainless steel material" as used herein means a material formed of stainless steel, and a shape of the material is not particularly limited. Examples of the shape include a plate shape (including a strip shape), a rod shape, and a tubular shape. Further, the material may be various shaped steels having cross-sectional shapes such as T-shape and I-shape. Further, the "impurities" means components which are contaminated due to various factors such as raw materials such as ore and scrap and production steps when the austenitic stainless steel material is industrially produced, and which are acceptable in a range that does not adversely affect the present invention. For example, those impurities also include inevitable impurities such as P and S, which are difficult to be removed.

Further, the austenitic stainless steel material according to an embodiment of the present invention can optionally contain one or more selected from: 0.100% or less of Al, 0.010% or less of O, 0.0001 to 0.500% of V, and 0.0001 to 0.0150% of B.

Further, the austenitic stainless steel material according to an embodiment of the present invention can optionally contain one or more selected from: 0.0001 to 0.500% of Ti, 0.010 to 0.500% of Co, 0.010 to 0.100% of Zr, 0.010 to 0.100% of Nb, 0.0005 to 0.0030% of Mg, 0.0003 to 0.0030% of Ca, 0.010 to 0.200% of Y, 0.001 to 0.100% of Ln, 0.001 to 0.500% of Sn, 0.001 to 0.500% of Sb, 0.010 to 0.100% of Pb, and 0.010 to 0.500% of W.

Each component will be described below in detail.
<0.200% or Less of C>

The C is an intrusion-type element and contributes to high strength by work hardening and heat treatment. Further, the C is an element that stabilizes the austenite phase and is effective for maintaining non-magnetism. However, if the C content is too high, it becomes hard and causes a decrease in cold workability. Therefore, the upper limit of the C content is set to 0.200%, and preferably 0.100%, and more preferably 0.090%. On the other hand, the lower limit of the C content is not particularly limited, but it may preferably be set to 0.010%, and more preferably 0.015%, and even more preferably 0.020%, in terms of refining costs.

4

<4.00% or Less of Si>

The Si is an element used as a deoxidizing agent for stainless steel in the steelmaking process. Further, the Si has a function of improving aging hardening properties in a heat treatment after cold rolling. However, since the Si has a higher solid solution strengthening function and has an action of decreasing stacking fault energy to improve work hardening, an excessively high Si content will be a factor of decreasing cold workability. Therefore, the upper limit of the Si content is set to 4.00%, and preferably 3.50%, and more preferably 3.00%. On the other hand, the lower limit of the Si content is not particularly limited, but it may preferably be set to 1.00%, and more preferably 1.20%, and even more preferably 1.50%.

<5.00% or Less of Mn>

The Mn is an element that forms oxide-based inclusions as MnO. Further, the Mn has a lower solid solution strengthening function and is an austenite-forming element, and has a function of suppressing strain-induced martensitic transformation. Therefore, the upper limit of the Mn content is set to 5.00%, and preferably 4.00%, and more preferably 3.00%. On the other hand, the lower limit of the Mn content is not particularly limited, but it may preferably be set to 0.01%, and more preferably 0.05%, and even more preferably 0.10%.

<4.00 to 10.00% of Ni>

The Ni is an element contained to obtain an austenite phase at an elevated temperature and room temperature. It is necessary to contain Ni in order to form a metastable austenite phase at room temperature and to allow the martensite phase to be induced during cold rolling. If the Ni content is too low, δ ferrite phases are formed at an elevated temperature, and the martensite phases are also formed in the cooling process to the room temperature, which will not allow any austenite monophase to be present. Therefore, the lower limit of the Ni content is set to 4.00%, and preferably 4.50%, and more preferably 5.00%. On the other hand, if the Ni content is too high, the martensite phase is difficult to be induced during the cold rolling. Therefore, the upper limit of the Ni content is set to 10.00%, and preferably 9.50%, and more preferably 9.00%.

<12.00 to 18.00% of Cr>

The Cr is an element that improves corrosion resistance. From the viewpoint of ensuring corrosion resistance suitable for structural parts and functional parts (particularly plate springs), the lower limit of the Cr content is set to 12.00%, and preferably 12.50%, and more preferably 13.00%. On the other hand, if the Cr content is too high, the cold workability is deteriorated. Therefore, the upper limit of the Cr content is set to 18.00%, and preferably 17.50%, and more preferably 17.00%.

<3.50% or Less of Cu>

The Cu is an element that has a function of hardening the stainless steel during the heat treatment. However, if the Cu content is too high, the hot workability is deteriorated, which will cause cracking. Therefore, the upper limit of the Cu content is set to 3.50%, and preferably 3.00%, and more preferably 2.00%. On the other hand, the lower limit of the Cu content is not particularly limited, but it may preferably be set to 0.01%, and more preferably 0.02%, and even more preferably 0.03%.

<1.00 to 5.00% of Mo>

The Mo is an effective element for improving the corrosion resistance of the austenitic stainless steel material. The Mo is also an effective element for suppressing the release of strain generated during cold rolling. In view of the recent use in structural parts and functional parts (particularly plate springs) for which improvement in corrosion resistance and settling resistance is required, the lower limit of the Mo content is set to 1.00%, and preferably 1.30%, and more preferably 1.50%. On the other hand, since Mo is expensive, an excessively high Mo content will increase the production cost. Further, the δ-ferrite phase and the α-ferrite phase are generated at an elevated temperature. Therefore, the upper limit of the Mo content is set to 5.00%, and preferably 4.50%, and more preferably 4.00%.

<0.200% or Less of N>

The N is an austenite-forming element. Further, the N is an extremely effective element for hardening the austenite phase and the martensite phase. However, an excessively high N content will cause blow holes during casting. Therefore, the upper limit of the N content is set to 0.200%, and preferably 0.150%, and more preferably 0.100%. On the other hand, the lower limit of the N content is not particularly limited, but it may preferably be set to 0.001%, and preferably 0.010%.

<Total Amount of C and N of 0.100% or More>

The C and N are elements that provide the same hardening action. From the viewpoint of sufficiently exerting such a hardening action, the lower limit of the total amount of C and N is set to 0.100%, and preferably 0.120%, and more preferably 0.140%.

<0.100% or Less of Al>

The Al has a higher oxygen affinity than Si and Mn. If the Al content is too high, coarse oxide-based inclusions, which function as starting points of internal cracks, are prone to be formed in cold rolling. Therefore, the upper limit of the Al content is preferably set to 0.100%, and more preferably 0.080%, and still more preferably 0.050%, and still more preferably 0.030%. On the other hand, the lower limit of the Al content is not particularly limited. However, an excessively low Al content leads to an increase in production cost. Therefore, it may preferably be set to 0.0001%, and more preferably 0.0003%, and even more preferably 0.0005%.

<0.010% or Less of O>

If the O content is too high, coarse inclusions having a particle size of more than 5 μm tends to be formed. Therefore, the upper limit of the O content is preferably set to 0.010%, and preferably 0.008%. On the other hand, the lower limit of the O content is not particularly limited. However, if the O content is too low, it will be difficult to oxidize Mn, Si and the like, so that a ratio of $Al_2O_3$ in the inclusions will be increased. Therefore, the lower limit of the O content is preferably set to 0.001%, and more preferably 0.003%.

<0.0001 to 0.500% of V>

The V is an element having a function of enhancing aging hardening properties in the heating of the heat treatment carried out after cold rolling. From the viewpoint of sufficiently producing such a function, the lower limit of the V content is preferably set to 0.0001%, and more preferably 0.0010%. On the other hand, an excessively high V content leads to an increase in production cost. Therefore, the upper limit of the V content is preferably set to 0.500%, and more preferably 0.400%, and even more preferably 0.300%.

<0.0001 to 0.0150% of B>

An excessively high B content causes a decrease in workability due to the generation of boride. Therefore, the upper limit of the B content is preferably set to 0.0150%, and more preferably 0.0100%. On the other hand, the lower limit of the B content is not particularly limited, but it may preferably be set to 0.0001%, and more preferably 0.0002%.

<0.0001 to 0.500% of Ti>

The Ti is a carbonitride-forming element, and fixes C and N, and suppresses deterioration of corrosion resistance due to sensitization. From the viewpoint of exerting such an effect, the lower limit of the Ti content is preferably set to 0.0001%, and more preferably 0.001%. On the other hand, if the Ti content is too high, an amount of solid solution of C and N will decrease, and it may be heterogeneously localized and precipitated as a carbide, which may inhibit the growth of recrystallized grains. Moreover, since Ti is expensive, the production cost will increase. Therefore, the upper limit of the Ti content is preferably set to 0.500%, and more preferably 0.400%, and even more preferably 0.300%.

<0.010 to 0.500% of Co>

The Co is an element that improves crevice corrosion resistance. From the viewpoint of exerting such an effect, the lower limit of the Co content is preferably set to 0.010%, and more preferably 0.020%. On the other hand, if the Co content is too high, the austenitic stainless steel material becomes hard to deteriorate the ductility. Therefore, the upper limit of the Co content is preferably set to 0.500%, and more preferably 0.100%.

<0.010 to 0.100% of Zr>

The Zr is an element having a high affinity to C and N, and has effects of precipitating as a carbide or a nitride during hot rolling, and of reducing solid solution C and solid solution N in the matrix phase to improve the workability. From the viewpoint of exerting such effects, the lower limit of the Zr content is preferably set to 0.010%, and more preferably 0.020%. On the other hand, if the Zr content is too high, the austenitic stainless steel material becomes hard to deteriorate the ductility. Therefore, the upper limit of the Zr content is preferably set to 0.100%, and more preferably 0.050%.

<0.010 to 0.100% of Nb>

The Nb is an element having a high, affinity to C and N, and has effects of precipitating as a carbide or a nitride during hot rolling, and of reducing solid solution C and solid solution N in the matrix phase to improve the workability. From the viewpoint of exerting such effects, the lower limit of the Nb content is preferably set to 0.010%, and more preferably 0.020%. On the other hand, if the Nb content is too high, the austenitic stainless steel material becomes hard to deteriorate the ductility. Therefore, the upper limit of the Nb content is preferably set to 0.100%, and more preferably 0.050%.

<0.0005 to 0.0030% of Mg>

The Mg forms Mg oxide together with Al in a molten steel and acts as a deoxidizing agent. From the viewpoint of exerting such an action, the lower limit of the Mg content is preferably set to 0.0005%, and more preferably 0.0008%. On the other hand, if the Mg content is too high, the toughness of the austenitic stainless steel material will decrease. Therefore, the upper limit of the Mg content is preferably set to 0.0030%, and more preferably 0.0020%.

<0.0003 to 0.0030% of Ca>

The Ca is an element that improves hot workability. From the viewpoint of exerting such an effect of Ca, the lower limit of the Ca content is preferably set to 0.0003%, and more preferably 0.0005%. On the other hand, if the Ca content is too high, the toughness of the austenitic stainless steel material will decrease. Therefore, the upper limit of the Ca content is preferably set to 0.0030%, and more preferably 0.0020%.

<0.010 to 0.200% of Y>

The Y is an element that reduces viscosity of a molten steel and improves cleanliness. From the viewpoint of exerting such effects of Y, the lower limit of the Y content is preferably set to 0.010%, and more preferably 0.020%. On the other hand, if the Y content is too high, the effect of Y is saturated and the workability is deteriorated. Therefore, the upper limit of the Y content is preferably set to 0.200%, and more preferably 0.100%.

<0.001 to 0.100% of Ln>

The Ln (lanthanoids: elements having an atomic number of 57 to 71 such as La, Ce, Nd) is an element that improves oxidation resistance at an elevated temperature. From the viewpoint of exerting such an effect of Ln, the lower limit of the Ln content is preferably set to 0.001%, and more preferably 0.002%. On the other hand, if the Ln content is too high, the effect of Ln is saturated, surface defects are generated during hot rolling, so that the producibility is deteriorated. Therefore, the upper limit of the Ln content is preferably set to 0.100%, and more preferably 0.050%.

<0.001 to 0.500% of Sn>

The Sn is an element effective to improve the workability by promoting the formation of a deformed zone during rolling. From the viewpoint of exerting such an effect of Sn, the lower limit of the Sn content is preferably set to 0.001%, and more preferably 0.003%. On the other hand, if the Sn content is too high, the effect of Sn is saturated and the workability is deteriorated. Therefore, the upper limit of the Sn content is preferably set to 0.500%, and more preferably 0.200%.

<0.001 to 0.500% of Sb>

The Sb is an element that is effective to improve the workability by promoting the formation of a deformed zone during rolling. From the viewpoint of exerting such an effect of Sb, the lower limit of the Sb content is preferably set to 0.001%, and more preferably 0.003%. On the other hand, if the Sb content is too high, the effect of Sb is saturated and the workability is deteriorated. Therefore, the upper limit of the Sb content is preferably set to 0.500%, and more preferably 0.200%.

<0.010 to 0.100% of Pb>

The Pb is an element effective to improve free-cutting properties. From the viewpoint of exerting such an effect of Pb, the lower limit of the Pb content is preferably set to 0.010%, and more preferably 0.020%. On the other hand, an excessively high Pb content will decrease a melting point of grain boundaries and lowers the bonding force of the grain boundaries, so that there is a concern that the hot workability may be deteriorated such as liquefaction cracking due to the melting of the grain boundaries. Therefore, the upper limit of the Pb content is preferably set to 0.100%, and more preferably 0.090%.

<0.010 to 0.500% of W>

The W has an action of improving the strength at an elevated temperature without impairing the ductility at room temperature. From the viewpoint of exerting such an effect of W, the lower limit of the W content is preferably set to 0.010%, and more preferably 0.020%. On the other hand, if the W content is too high, coarse eutectic carbides are formed, causing a decrease in ductility. Therefore, the upper limit of the W content is preferably set to 0.500%, and more preferably 0.450%.

<$Md_{30}$: −40.0 to 0° C.>

The $Md_{30}$ represents a temperature (° C.) at which 50% of the structure is transformed into martensite when a strain of 0.30 is applied to the austenite (γ) monophase. Therefore, it means that as the Md30 is higher (higher temperature), the austenite is more unstable.

The $Md_{30}$ is represented by the following equation (1):

$$Md_{30} = \qquad (1)$$
$$551 - 462(C + N) - 9.2Si - 8.1Mn - 29(Ni + Cu) - 13.7Cr - 18.5Mo$$

In the equation, the symbols of the elements each represents a content (% by mass) of each element.

If the $Md_{30}$ is too low, the stability of the austenite phase will increase, and it will be difficult to transform the austenite phase into the strain-induced martensite phase by cold rolling, so that the strength cannot be sufficiently increased. Therefore, the lower limit of the $Md_{30}$ is set to −40.0° C. On the other hand, if the $Md_{30}$ is too high, the austenite phase becomes unstable and an amount of the strain-induced martensite phase transformed by cold rolling increases, as well as it will be difficult to control a dislocation density of each phase as described below to a desired range, so that desired ductility and settling resistance cannot be obtained. Therefore, the upper limit of the $Md_{30}$ is set to 0° C.

The austenitic stainless steel material according to the embodiment of the present invention has a metallographic structure in which a dislocation density of a strain-induced martensite phase is $8.0 \times 10^{16}$ $m^{-2}$ or less, preferably $7.5 \times 10^{16}$ $m^{-2}$ or less, and a dislocation density of a retained austenite phase is $1.5 \times 10^{16}$ to $6.0 \times 10^{16}$ $m^{-2}$, preferably $2.0 \times 10^{16}$ to $5.5 \times 10^{16}$ $m^{-2}$.

When the dislocation density of the retained austenite phase is less than $1.5 \times 10^{16}$ $m^{-2}$, dislocation motion in the phase cannot be sufficiently suppressed. As a result, the stress relaxation percentage is decreased, so that the desired settling resistance cannot be obtained. Further, when the dislocation density of the strain-induced martensite phase is more than $8.0 \times 10^{16}$ $m^{-2}$ and when the dislocation density of the retained austenite phase is more than $6.0 \times 10^{16}$ $m^{-2}$, the strength of the austenitic stainless steel will be too high, so that the desired ductility is not obtained. The lower limit of the dislocation density of the strain-induced martensite phase is not particularly limited, and it may be 0 $m^{-2}$.

Here, the dislocation density refers to the total length of dislocations contained in crystal per unit volume. In general, the cold rolling results in accumulation of some of the moved dislocations in the material, so that the dislocation density increases. The dislocations thus accumulated interact with subsequent dislocations to impede the movement of the dislocations, so that an increase in dislocation density improves the strength and settling resistance.

The metallographic structure of the austenitic stainless steel material according to the embodiment of the present invention has a content of the strain-induced martensite phase of 20 to 55% by volume, and preferably 25 to 50% by volume.

When the content of the strain-induced martensite phase is less than 20% by volume, the strength and settling resistance of the austenitic stainless steel material are decreased. When the content of the strain-induced martensite phase is more than 55% by volume, the ductility of the austenitic stainless steel material is decreased.

Here, the content of the strain-induced martensite phase can be measured by using a method known in the art. For example, it may be measured using a ferrite scope or the like.

The austenitic stainless steel material according to the embodiment of the present invention preferably has a tensile strength (TS) of 1400 MPa or more, and more preferably 1450 MPa or more. By controlling the tensile strength to such a range, the strength of the austenitic stainless steel material can be ensured. The upper limit of the tensile strength is not particularly limited, but it may typically be 2100 MPa, and preferably 2050 MPa.

Here, the tensile strength of the austenitic stainless steel material can be measured in accordance with JIS Z 2241: 2011.

The austenitic stainless steel material according to an embodiment of the present invention preferably has an elongation at brake (EL) of 2.0% or more, and more preferably 3.0% or more. By controlling the elongation at break to such a range, the ductility of the austenitic stainless steel material can be ensured. The upper limit of the elongation at break is not particularly limited, but it may typically be 20.0%, and preferably 15.0%.

Here, the elongation at break of the austenitic stainless steel material can be measured in accordance with JIS Z 2241: 2011.

The austenitic stainless steel material according to an embodiment of the present invention has a Vickers hardness of preferably 420 HV or more, and more preferably 450 HV or more. By controlling the Vickers hardness to such a range, the strength of the austenitic stainless steel material can be ensured. The upper limit of the Vickers hardness is not particularly limited, but it may typically be 600 HV, and preferably 580 HV.

The austenitic stainless steel material according to an embodiment of the present invention has a stress relaxation percentage of preferably 1.00% or less, and more preferably 0.90% or less, and even more preferably 0.80% or less, which is represented by the following equation (2):

$$\text{Stress relaxation percentage} = (\sigma 1 - \sigma 2)/\sigma 1 \qquad (2)$$

In the equation, $\sigma 1$ is a stress less than 0.2% yield strength, and $02$ is a stress on 180 seconds after the stress of $\sigma 1$ is applied.

By controlling the stress relaxation percentage to the above range, the settling resistance of the austenitic stainless steel can be ensured. The lower limit of the stress relaxation percentage is not particularly limited, but it may typically be 0%, and preferably 0.10%, and more preferably 0.20%.

Here, the 0.2% yield strength of the austenitic stainless steel material can be measured in accordance with JIS Z 2241: 2011.

The thickness of the austenitic stainless steel material according to an embodiment of the present invention is not particularly limited, but it may preferably be 0.2 mm or less, and more preferably 0.15 mm or less. The controlling of the thickness to such a thickness can reduce the thicknesses and weights of various parts. The lower limit of the thickness may be adjusted depending on intended use and is not particularly limited, but it may typically be 0.01 mm.

The austenitic stainless steel material according to an embodiment of the present invention can be produced, for example, by subjecting a rolled material having the above composition to a solution heat treatment, followed by cold rolling and then a heat treatment, although not particularly limited thereto.

The rolled material is not particularly limited as long as it has the above composition, and rolled materials produced by a method known in the art may be used. As the rolled material, a hot-rolled material or a cold-rolled material can be used, but the cold-rolled material having a lower thickness is preferable.

The hot-rolled material can be produced by melting the stainless steel having the above composition, forging or casting it, and then hot-rolling it and optionally subjecting it to an aging treatment. Further, the cold-rolled material can be produced by cold-rolling the hot rolled material. After each rolling, annealing or washing with an acid may optionally be carried out.

The conditions for the solution treatment (solid solution treatment) of the rolled material are not particularly limited and they may be appropriately set depending on the composition of the rolled material. For example, the rolled material can be subjected to a solution heat treatment by heating and maintaining the rolled material at 1000 to 1200° C., and then rapidly cooling it.

The cold rolling after the solution treatment is carried out in order to generate processing strain in the rolled material and transform a part of the austenite phase into the strain-induced martensite phase, and also to increase the dislocation densities of the strain-induced martensite phase and the retained austenite phase.

The cold rolling is caried out under conditions where the rolling reduction ratio is such that the dislocation density of the strain-induced martensite phase is $8.0 \times 10^{16}$ m$^{-2}$ or less, the dislocation density of the retained austenite phase is $1.5 \times 10^{16}$ to $6.0 \times 10^{16}$ m$^{-2}$, and the content of the strain-induced martensite phase is 20 to 55% by volume. By performing the cold rolling at such a rolling reduction ratio, it is possible to obtain an austenitic stainless steel material having high strength and high ductility and improved settling resistance.

It should be noted that the specific rolling reduction ratio of the cold rolling may be appropriately adjusted depending on the composition of the rolled material, but it may generally be 20 to 80%, and preferably 25 to 70%.

After cold rolling, a heat treatment can optionally be performed. By performing the heat treatment, the dislocation density of the strain-induced martensite phase increased by the cold rolling can be reduced, so that the dislocation density of the strain-induced martensite phase can be easily controlled to the predetermined range.

The specific conditions for the heat treatment may be appropriately adjusted depending on the composition of the rolled material, and the like. The heating temperature is preferably 100 to 600° C., and more preferably 200 to 500° C., and the heating time is preferably 0.5 to 5 hours, and more preferably 1 to 3 hours.

The austenitic stainless steel material according to an embodiment of the present invention has high strength and high ductility, and has improved settling resistance. Therefore, it can be used for various parts that are required to reduce the thickness and weight, for example, structural parts and functional parts in communication devices such as smartphones and precision devices such as personal computers. In particular, the austenitic stainless steel material according to the embodiment of the present invention is suitable for use in plate springs.

EXAMPLES

Hereinafter, the present invention-will be described in detail with reference to Examples. However, it should not be construed that the present invention is limited to those Examples.

Thirty Kilograms of stainless steel having each composition as shown in Table 1 were melted by vacuum melting, forged into a plate having a thickness of 30 mm, and then heated at 1230° C. for 2 hours, and hot-rolled to a thickness of 4 mm to obtain a hot-rolled plate. The hot-rolled plate was then annealed and washed with an acid to obtain a hot-rolled annealed plate, and the hot-rolled annealed plate was then subjected to repeated cold-rolling and annealing to decrease the thickness to obtain a cold-rolled plate.

ment of the dislocations develops low-angle grain boundaries and cell structures. By capturing these with X-rays, the dislocation density can be calculated.

A sample was cut from each austenitic stainless steel material at any position and subjected to mechanical polishing and chemical polishing.

The surface structure of the sample was subjected to X-ray diffraction, and a dislocation density $\rho$ was calculated from single diffraction peaks of $\{111\}$ of the retained austenite phase and $\{110\}$ of the strain-induced martensite phase. The following equation (3) was used to calculate the dislocation density $\rho$.

$$\rho = \left[3(2\pi)^{1/2}\langle\varepsilon^2\rangle^{1/2}\right]/Db \tag{3}$$

TABLE 1

| Type of Steel | Composition (% by mass) | | | | | | | | | | $Md_{30}$ |
|---|---|---|---|---|---|---|---|---|---|---|---|
| | C | Si | Mn | Ni | Cr | Cu | Mo | N | Others | C + N | (° C.) |
| A | 0.085 | 2.67 | 0.22 | 8.36 | 13.56 | 0.11 | 2.25 | 0.067 | — | 0.152 | −18.6 |
| B | 0.082 | 1.99 | 1.10 | 7.84 | 14.63 | 0.16 | 2.60 | 0.058 | — | 0.140 | −21.4 |
| C | 0.094 | 2.36 | 0.36 | 8.25 | 14.25 | 0.17 | 2.57 | 0.067 | Al: 0.007 | 0.161 | −35.0 |
| D | 0.072 | 2.53 | 0.41 | 6.02 | 14.10 | 2.18 | 2.18 | 0.101 | B: 0.002 | 0.173 | −26.8 |
| E | 0.102 | 1.86 | 0.70 | 8.07 | 13.94 | 0.24 | 2.13 | 0.054 | V: 0.001 Ti: 0.002 | 0.156 | −15.2 |
| F | 0.090 | 2.88 | 0.25 | 8.11 | 13.81 | 0.15 | 2.34 | 0.071 | Co: 0.021 Sn: 0.011 W: 0.053 | 0.161 | −23.9 |
| G | 0.097 | 2.41 | 0.42 | 8.25 | 14.32 | 0.14 | 2.45 | 0.068 | Nb: 0.052 Ca: 0.0025 | 0.165 | −35.6 |
| a | 0.114 | 3.20 | 0.43 | 7.79 | 14.40 | 0.98 | 2.70 | 0.072 | | 0.186 | −69.4 |
| b | 0.080 | 2.72 | 0.52 | 6.74 | 13.58 | 0.79 | 2.19 | 0.062 | | 0.142 | 11.2 |

(Remarks)

The balance is Fe and impurities.

The underlines indicate that they are beyond the scope of the present invention.

The cold-rolled material obtained above was then subjected to a solution treatment which was maintained at 1050° C. for 10 minutes and then rapidly cooled. The cold rolling was then carried out at each rolling reduction ratio as shown in Table 2 to obtain a final thickness of 0.2 mm. In addition, the test Nos. 18 to 22 were subjected to the heat treatment under the conditions shown in Table 2 after the cold rolling.

The austenitic stainless steel material thus obtained was evaluated as follows.

(Amount of Strain-Induced Martensite Phase)

A sample was cut out from each of austenitic stainless steel materials, and an amount of strain-induced martensite was measured using a ferrite scope (FERITESCOPE MP30E-S from Fisher). The measurement was carried out at arbitrary three points on the surface of the sample, and an average value thereof was used as the results. In Table 2, the strain-induced martensite phase is referred to as "M Phase".

(Dislocation Density of Strain-Induced Martensite Phase and Retained Austenite Phase)

The dislocation density was calculated by line profiling analysis of the shape of the diffraction peak measured by X-ray diffraction. In the dislocation-introduced structure, lattice strain occurs around the dislocations, and the arrangein which $\langle\varepsilon^2\rangle$ is a root-mean-square strain, D is a crystallite size, and b is a Burgers vector.

Also, the root-mean-square strain $\langle\varepsilon^2\rangle$ and the crystallite size D used in the equation (3) were determined from the following equation (4):

$$-\ln A(L)/L = 1/D + \left[-1/2D^2\right) + 2\pi^2\langle\varepsilon^2\rangle h_0^2/a^2\right]L \tag{4}$$

in which lnA(L) is a logarithm of a Fourier coefficient of a line profile of each diffraction peak, L is a Fourier length, $h_0^2 = h^2 + k^2 + l^2$ (h, k, and l are plane indices of the diffraction peaks used), and a is a lattice constant. With $-\ln A(L)/L$ on the vertical axis and L on the horizontal axis, D was determined from the y-intercept 1/D of the plot, and $\langle\varepsilon^2\rangle$ was determined from the slope $[-1/(2D^2)+2\pi^2<\varepsilon^2>h_0^2/a^2]$.

Further, an X-ray diffractometer (from Rigaku Corporation) was used as the analyzer, and a Cu dry bulb was used as the target. In addition, in Table 2, the retained austenite phase is expressed as the $\gamma$ phase.

13

(0.2% Yield Strength, Tensile Strength (TS) and Elongation at Break (EL))

A JIS 13 B sample was cut out from each of the austenitic stainless steel materials, and the measurement was carried out using this sample in accordance with JIS Z 2241: 2011.

(Vickers Hardness)

A sample was cut out from each of the austenitic stainless steel materials, and the Vickers hardness was determined in accordance with JIS Z 2244: 2009 using a Vickers hardness tester. The test force was 294.2N. The Vickers hardness was determined at arbitrary five points, and an average value thereof was used as the results. In Table 2, the Vickers hardness is abbreviated as "Hardness".

(Stress Relaxation Percentage)

The stress relaxation percentage was determined based on the above equation (2). The $\sigma 1$ was 300 MPa. The tensile speed until $\sigma 1$ reached 300 MPa was 0.5 mm/sec.

The results of each of the above evaluations are shown in Table 2.

14 an insufficient stress relaxation percentage, because it was of the steel type having a lower $Md_{30}$ and higher stability.

The austenitic stainless steel material of Test No. 17 (Comparative Example) had a larger amount of the strain-induced martensitic phase, and an insufficient elongation (EL), because it was of the steel type having higher $Md_{30}$ and lower stability.

The austenitic stainless steel material of Test No. 18 (Comparative Example) had an insufficient tensile strength (TS) and an insufficient stress relaxation percentage because the dislocation density of the retained austenite phase was too low.

The austenitic stainless steel material of Test No. 22 (Comparative Example) had an insufficient tensile strength (TS) and an insufficient stress relaxation percentage because the amount of the strain-induced martensite phase and the dislocation density of the retained austenite phase were too

TABLE 2

| Test Nos. | Type of Steel | Rolling Reduction Ratio (%) | Heat Treatment Temp. (° C.) | Heat Treatment Time (s) | Amount of M Phase (vol. %) | Dislocation Density ($\times 10^{16} m^{-2}$) M Phase | Dislocation Density γ Phase | 0.2% Yield Strength (MPa) | TS (MPa) | EL (%) | Hardness (HV) | Stress Relaxation Percentage (%) | Classification |
|---|---|---|---|---|---|---|---|---|---|---|---|---|---|
| 1 | A | 20 | — | — | 17 | 5.3 | 1.2 | 973 | 1369 | 34.8 | 397 | 1.25 | Comp. |
| 2 | A | 25 | — | — | 27 | 5.8 | 1.9 | 1003 | 1531 | 22.3 | 420 | 0.98 | Ex. |
| 3 | A | 30 | — | — | 33 | 5.9 | 2.2 | 1287 | 1577 | 19.5 | 451 | 0.77 | Ex. |
| 4 | A | 40 | — | — | 32 | 6.3 | 3.3 | 1627 | 1707 | 7.3 | 494 | 0.49 | Ex. |
| 5 | A | 50 | — | — | 37 | 6.6 | 4.7 | 1804 | 1896 | 5.7 | 519 | 0.53 | Ex. |
| 6 | A | 60 | — | — | 47 | 7.4 | 5.7 | 1980 | 2024 | 3.9 | 547 | 0.51 | Ex. |
| 7 | A | 70 | — | — | 54 | 7.7 | 5.9 | 1995 | 2051 | 2.7 | 571 | 0.50 | Ex. |
| 8 | A | 75 | — | — | 58 | 8.2 | 6.4 | 2003 | 2130 | 1.6 | 591 | 0.47 | Comp. |
| 9 | B | 40 | — | — | 34 | 6.7 | 3.8 | 1631 | 1763 | 6.6 | 494 | 0.52 | Ex. |
| 10 | C | 40 | — | — | 36 | 6.8 | 3.6 | 1626 | 1788 | 5.9 | 483 | 0.50 | Ex. |
| 11 | D | 50 | — | — | 36 | 7.2 | 4.8 | 1864 | 1912 | 5.5 | 518 | 0.54 | Ex. |
| 12 | E | 50 | — | — | 39 | 7.0 | 4.9 | 1859 | 1924 | 5.2 | 534 | 0.58 | Ex. |
| 13 | F | 30 | — | — | 22 | 5.5 | 1.6 | 1226 | 1493 | 19.7 | 433 | 0.42 | Ex. |
| 14 | F | 40 | — | — | 30 | 5.9 | 2.3 | 1530 | 1665 | 9.2 | 478 | 0.48 | Ex. |
| 15 | G | 40 | — | — | 33 | 6.0 | 2.7 | 1510 | 1651 | 9.7 | 475 | 0.67 | Ex. |
| 16 | a | 30 | — | — | 15 | 5.1 | 1.9 | 1003 | 1380 | 11.2 | 457 | 1.11 | Comp. |
| 17 | b | 50 | — | — | 59 | 7.7 | 4.8 | 1895 | 1940 | 1.6 | 528 | 0.51 | Comp. |
| 18 | A | 20 | 200 | 3600 | 17 | 4.7 | 1.2 | 1059 | 1380 | 26.2 | 407 | 1.22 | Comp. |
| 19 | A | 30 | 200 | 7200 | 23 | 4.3 | 2.1 | 1328 | 1598 | 12.7 | 467 | 0.68 | Ex. |
| 20 | A | 30 | 500 | 3600 | 24 | 0.1 | 2.4 | 1591 | 1703 | 8.4 | 483 | 0.59 | Ex. |
| 21 | A | 40 | 500 | 3600 | 35 | 0.2 | 3.1 | 1613 | 1776 | 5.5 | 556 | 0.55 | Ex. |
| 22 | A | 40 | 650 | 3600 | 13 | 0.0 | 0.0 | 949 | 1370 | 32.8 | 402 | 1.15 | Comp. |

(Remarks)
The underlines indicate that they are beyond the scope of the present invention.

As shown in Table 2, it was confirmed that the austenitic stainless steel materials of Test Nos. 2 to 7, 9 to 15 and 19-21 (Examples of the present invention) had improved tensile strength (TS), elongation at break (EL) and stress relaxation percentage.

On the other hand, the austenitic stainless steel material of Test No. 1 (Comparative Example) had an insufficient tensile strength (TS) and an insufficient stress relaxation percentage because the amount of the strain-induced martensite phase and the dislocation density of the retained austenite phase were too low.

The austenitic stainless steel material of Test No. 8 (Comparative Example) had an excessively high amount of the strain-induced martensite phase, so that the elongation (EL) was not sufficient.

The austenitic stainless steel of Test No. 16 (Comparative Example) had a smaller amount of the strain-induced martensitic phase, and an insufficient tensile strength (TS) and low. This would be because the temperature of the heat treatment was too high, resulting in tempering and reverse transformation.

As can be seen from the above results, according to the present invention, it is possible to provide an austenitic stainless steel material having high strength, high ductility, and improved settling resistance, and to provide a method for producing the same.

Also, according to the present invention, it is possible to provide a plate spring having high strength, excellent dimensional accuracy, and a long life.

The invention claimed is:

1. An austenitic stainless steel plate,
wherein the austenitic stainless steel plate comprises, on a mass basis, 0.200% or less of C, 4.00% or less of Si, 5.00% or less of Mn, 4.00 to 10.00% of Ni, 12.00 to 18.00% of Cr, 3.50% or less of Cu, 1.00 to 5.00% of Mo, and 0.200% or less of N, a total amount of C and N of 0.100% or more, and the balance being Fe and impurities;

wherein the austenitic stainless steel plate has a value of $Md_{30}$ of −40.0 to 0° C., the value of $Md_{30}$ being represented by the following equation (1):

$$Md_{30} = \tag{1}$$

$$551 - 462(C + N) - 9.2Si - 8.1Mn - 29(Ni + Cu) - 13.7Cr - 18.5Mo$$

in which the symbols of the elements in equation (1) each represents a content % by mass of each element;

wherein the austenitic stainless steel plate has a metallographic structure having a dislocation density of a strain-induced martensite phase of $8.0 \times 10^{16}$ m$^{-2}$ or less, a dislocation density of a retained austenite phase of $1.5 \times 10^{16}$ to $6.0 \times 10^{16}$ m$^{-2}$, and a content of the strain-induced martensite phase of 20 to 55% by volume; and wherein the austenitic stainless steel plate has a thickness of 0.20 mm or less.

2. The austenitic stainless steel plate according to claim 1, further comprising, on a mass basis, one or more selected from 0.100% or less of Al, 0.010% or less of O, 0.0001 to 0.500% of V, and 0.0001 to 0.0150% of B.

3. The austenitic stainless steel plate according to claim 1, further comprising, on a mass basis, one or more selected from 0.0001 to 0.500% of Ti, 0.010 to 0.500% of Co, 0.010 to 0.100% of Zr, 0.010 to 0.100% of Nb, 0.0005 to 0.0030% of Mg, 0.0003 to 0.0030% of Ca, 0.010 to 0.200% of Y, 0.001 to 0.100% of lanthanoids, 0.001 to 0.500% of Sn, 0.001 to 0.500% of Sb, 0.010 to 0.100% of Pb, and 0.010 to 0.500% of W.

4. The austenitic stainless steel plate according to claim 1, wherein the austenitic stainless steel plate has a tensile strength (TS) of 1400 MPa or more and an elongation at break (EL) of 2.0% or more.

5. The austenitic stainless steel plate according to claim 1, wherein the austenitic stainless steel plate has a stress relaxation percentage of 1.00% or less, the stress relaxation percentage being represented by the following equation (2):

$$\text{stress relaxation percentage} = (\sigma 1 - \sigma 2)/\sigma 1 \tag{2}$$

in which $\sigma 1$ is a stress less than 0.2% yield strength, and $\sigma 2$ is a stress on 180 seconds after applying the stress of $\sigma 1$.

6. The austenitic stainless steel plate according to claim 2, further comprising, on a mass basis, one or more selected from 0.0001 to 0.500% of Ti, 0.010 to 0.500% of Co, 0.010 to 0.100% of Zr, 0.010 to 0.100% of Nb, 0.0005 to 0.0030% of Mg, 0.0003 to 0.0030% of Ca, 0.010 to 0.200% of Y, 0.001 to 0.100% of lanthanoids, 0.001 to 0.500% of Sn, 0.001 to 0.500% of Sb, 0.010 to 0.100% of Pb, and 0.010 to 0.500% of W.

7. A plate spring, comprising the austenitic stainless steel plate according to claim 1.

8. A plate spring, comprising the austenitic stainless steel plate according to claim 2.

\* \* \* \* \*